Patented Dec. 27, 1949

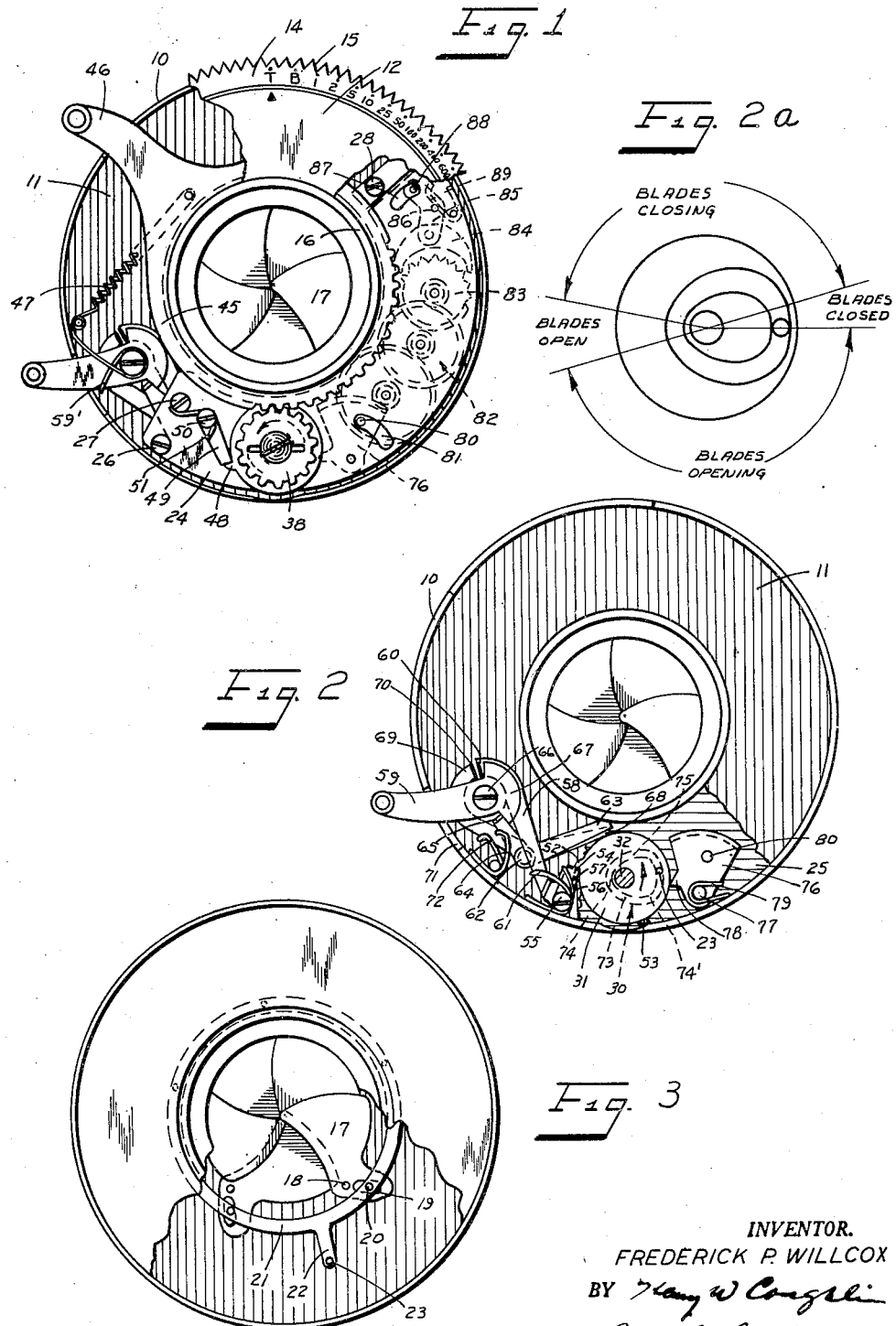

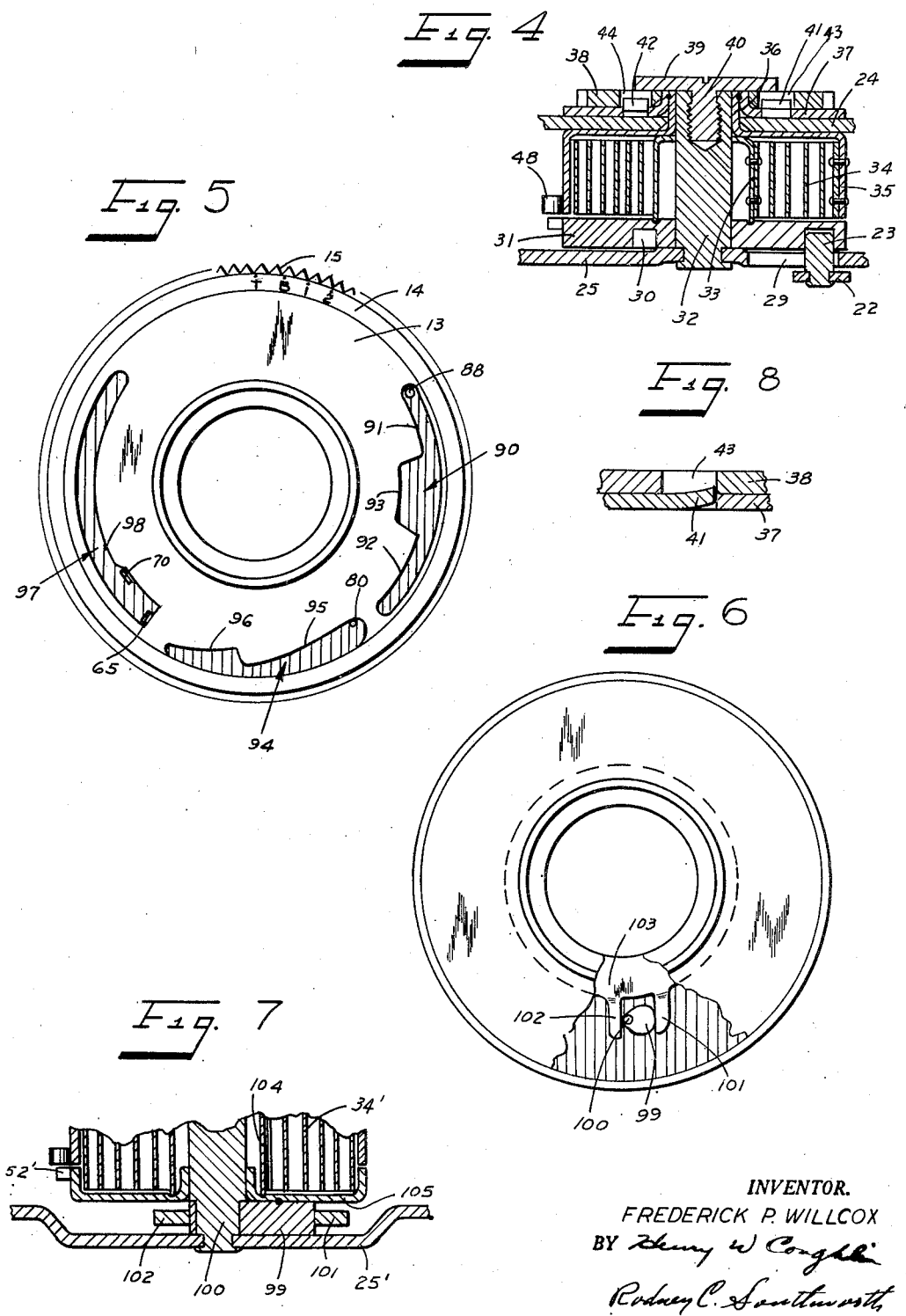

2,492,723

UNITED STATES PATENT OFFICE 2,492,723

OPERATING MECHANISM FOR SYMMETRICAL OPENING CAMERA SHUTTERS

Frederick P. Willcox, Vestal, N. Y., assignor to General Aniline & Film Corporation, New York, N. Y., a corporation of Delaware Application June 25, 1946, Serial No. 679,225

6 Claims. (Cl. 95—63)

This invention pertains to shutters, such as the so-called between-the-lens type shutters, and more especially to a novel shutter of that type adapted to be contained within the usual cylindrical shutter casing and having a novel cam system for actuating the shutter blades for making very rapid exposures and for admitting a maximum amount of light during said exposures.

Among the objects of the invention is that of devising a shutter of the type described which shall be relatively simple and which shall also be extremely rugged and dependable in its action.

It is another object of the invention to devise such a shutter wherein speeds from the slowest normally provided for such shutters shall be combined with the possibility of extremely rapid exposures and the usual intermediate exposures.

It is a further object of the invention to devise a complete self-contained shutter of the type described which shall have a minimum mass for the parts which are to be moved during the actual opening and closing of the shutter blades.

Another object of the invention is that of providing for actuating the blades of a shutter of this type by a power driven cam mechanism adapted to open the blades with a constant acceleration and to close the blades with a similar constantly accelerated motion.

This last-mentioned object of the invention is obtained without resort to acceleration of parts prior to actually starting the opening movement for the blades and without provision of additional elements, such as a flywheel, whereby the blade actuating mechanism is caused to build up an amount of inertia prior to effectual actuation of the shutter as in the opening movement for the blades.

It is a further object of the invention to devise such a shutter wherein the setting or cocking movement is accomplished by certain parts independently movable with respect to other elements of the shutter and returnable to initial position after setting the shutter so that there are no parts, such as the well-known "master member" or setting levers, which have to be moved during the actual opening and closing of the shutter for effecting an exposure.

It is another object of the invention to devise a shutter of the type described which shall have its movements cushioned by the retarding means except at the very fastest speed for which it may be set.

Other objects will be apparent from the following disclosure.

The invention is herein described as embodied in shutter mechanism illustrative of one form the invention may take. The usual shutter blades pivoted for swinging to and from open and closed positions are interconnected through a blade ring or by other interconnecting linkage which is in turn actuated throughout the requisite angular extent by a cam or other equivalent means adapted to produce practically immediately upon release, a constantly accelerated motion for the opening of the blades, thereafter a dwell for a period during which the blades remain in open position, and then closing of the blades with similar, constantly accelerated motion. Such a cam may take several forms, two of which are herein illustrated and will hereinafter be described in greater detail.

While it is contemplated that different power systems may be employed, the shutter herein described is actuated by a spring motor. While that specifically described is a spiral type spring, it is to be understood that other spring motors may be used and that what is herein specifically described is to serve as an illustration of one convenient form which the invention may take. The cocking of the shutter is effected by the usual lever projecting upwardly from the casing and release is likewise effected by a short projecting lever or trigger. It is to be understood that in certain installations, the movement of the cocking lever and also that of the trigger may be effected by control from other parts of the camera, but in that instance, such controls would merely be interconnected to effect the same or a similar movement of parts.

Various speeds from relatively slow speeds to a speed faster than is now commercially available in shutters of this type are provided. Time exposures as well as bulb exposures are also available and these are set by the usual setting ring graduated in a manner well known to those familiar with the art. While any of the well-known types of retarding means may be employed, that herein illustrated is of the type involving a train of gears, an escapement or star wheel, and the usual vibrating pallet. The assembly of the shutter is facilitated by its simplicity and by the fact that two plates extending partway around the shutter casing carry a great deal of the operating mechanism. These comprise a sub-assembly and are installed as a unit.

The invention will hereinafter be described in greater detail by reference to the accompanying figures of drawing, wherein:

Fig. 1 is a view of the shutter showing the cocking and part of the other mechanism, most of the speed setting ring being broken away.

Fig. 2 is a view of the shutter showing one type of cam for actuating the blade ring, also the release mechanism.

Fig. 2a is a detail view of the cam of Fig. 2.

Fig. 3 is a similar view showing the blades and the manner in which they are interconnected for actuation by a blade ring.

Fig. 4 is a sectional view of the spring motor or power unit.

Fig. 5 is a plan view of the speed setting ring and its cams which position the various speed controlling means and the various parts of the release mechanism for effecting time and bulb exposures.

Fig. 6 is a view showing details of a modified type of blade ring and cam for working therewith.

Fig. 7 is a section similar to Fig. 4 showing certain modifications in the power unit when the same is to be employed with a cam, such as that of Fig. 6.

Fig. 8 is a detail view of part of the machanism of Fig. 4.

Now referring to Figs. 1, 2, and 3, the general construction of the shutter will be described. The entire mechanism is housed within a casing of hollow cylindrical or annular type having an outer cylindrical wall 10, a center plate or wall 11, a front face 12 adjacent and within which functions a speed setting ring 13, Fig. 5, the outer indexed periphery of which is designated by numeral 14, and the edge of which is serrated as at 15. The inner wall of the shutter comprises a cylindrical tube 16 extending along the length of the shutter and within which or by which the lens mechanism is to be supported.

The shutter has a plurality of blades 17, five such blades being shown here, although it is to be understood that any convenient number may be used. These blades are pivoted as at 18, and extend outwardly having slots 19 which cooperate with the pins 20 fixed in a so-called blade ring 21. The blade ring 21, as is familiar to those conversant with this art, is oscillated to and fro throughout a relatively small angular extent for opening and closing the blades. Other interconnecting means for the blade extensions may be employed so long as that means provides the proper motion for swinging the blades to open position and for closing them upon reverse movement of the parts. The blade ring has an extension 22 from which projects a pivot pin or cam follower by means of which the necessary motion is imparted to the blade ring by the cam as will hereinafter be explained in greater detail.

Now referring to Figs. 1, 2, and 4, the blade opening and closing mechanism including the power unit itself will be described. This unit of general cylindrical shape occupies a relatively small space and is fixedly positioned between two superimposed plates, the top or outermost one of which is designated by numeral 24 and the lower or inner plate by numeral 25. In Fig. 1, the outer plate is indicated by its respective numeral while the plate 25 must be understood to lie directly beneath it, these plates being held in position between the cylindrical parts of the casing 10 and 16, and being maintained in spaced relationship with respect to the center plate 11 and to each other by the retaining screws 26, 27, and 28 and suitable spacers between the plates themselves. Other parts of the mechanism are retained in functional relationship by these plates and by removal of the plates, that part of the mecha- nism functioning within and supported by the plates may be assembled and installed or withdrawn from the casing as a unit.

The pin or follower 23 projects through a slot 29 in the plate 25 and enters the cam groove 30 in the cam plate 31 having a relatively tight, but working fit therein. This plate 31 is rotatably mounted on a central spindle 32 riveted or otherwise tightly held within the plate 25 which is upset slightly for the purpose of providing a more suitable bearing for the cam plate and clearance at the outer portions thereof. The plate 31 has fixed thereto a cup-shaped sleeve 33, the connection as herein shown being attached by soldering or welding, or, in fact, by any other suitable means. Sleeve 33 has attached thereto by rivets or by other means the inner end of a spiral spring 34. The outer end of spring 34 is similarly attached to a spring casing or barrel which encompasses and completes the enclosure of the entire spring. The top portion of the casing is necked down as at 36 for bearing against the upper end of the spindle 32. The neck 36 of the spring casing extends through an appropriately sized opening in plate 34 and is permanently connected to a disk 37 positioned above the plate 24, this disk 37 being connected to the neck 36 of the casing in any suitable manner, but perferably by soldering the two at appropriate places after assembly of the parts about the plate 24. A gear 38 is mounted at the outer face of plate 37 and is of a thickness so that its outer face is about flush with the ends of the neck 36 and the outturned portion of plate 37. This gear 38 and the other parts previously described are held in position on the spindle 32 by the very large head 39 of a screw 40 threaded into the spindle.

As shown in Figs. 4 and 8, the disk 37 has upturned, oppositely directed pawls 41 and 42 which engage within the cooperating slots 43 and 44 in the gear 38. These pawls 41 and 42 and disk 37 are from spring material and while the gear 38, when rotated in one direction rotates the disk, movement of the parts in the opposite direction merely results in the said pawls springing downwardly thereby permitting free relative movement between the parts. If desired, these pawls may be parts separate from the disk in which event they are preferably hinged thereto and caused to spring upwardly under the influence of relatively light springs. Of course, the pawls and slots may be reversed to become parts of the opposite elements.

In operation, the setting of the shutter involves making a complete revolution for the gear 38, although it is to be understood that normally the spring 34 should have a very appreciable amount of initial tension therein prior to the single revolution by which it is additionally tensioned for actuating the shutter blades throughout the cycle of one complete exposure.

Now referring to Fig. 1, the gear 38 meshes with teeth on a ring 45 movable about the inner cylindrical part 13 of the casing, the number of teeth on the said ring being sufficient and angularly disposed in such manner as to impart a single revolution to the gear. Ring 45 has projecting outwardly therefrom the setting or cocking lever 46 urged in one direction by the spring 47. The outer cylindrical part 10 of the casing is slotted to provide a space within which the lever 46 may be moved in a clockwise direction or against the tension of spring 47 for winding spring 34 after which, of course, the said lever moves back to that position shown in Fig. 1.

During the winding operation, the gear 38 drives disk 37 through the interconnection between the pawls on the disk and the slots in the gear, and that motion is imparted to the spring casing 35 whereby the spring itself is moved for winding it since at that time cam plate 31 is held stationary by mechanism presently to be described.

As shown in Figs. 1 and 4, the casing 35 has projecting therefrom a lug 48 which engages against a stop pawl 49 hinged at 50 and pressed into engagement with the outer surface of the casing 35 by a spring 51. During the initial winding of the spring so as to put considerable tension therein, the disk 31 being held against rotation, the lug 48 merely clicks past the pawl 49. After that, the parts retain the position shown in Fig. 1 except during setting of the shutter at which time the spring is wound by turning the case one complete revolution whereupon the lug 48 again clicks by the pawl, thereby to hold the spring motor under operating tension (one revolution more than initial tension) until the shutter is released.

As shown in Figs. 1, 2, and 4, the cam disk 31 has two lugs, one adjacent the upper face of the disk as viewed in Fig. 4, and designated by numeral 52, and a second, a little more than 90° removed and adjacent the lower face and designated by numeral 53. The lug 52 engages against a stop pawl 54, this pawl being freely pivoted at 55 and tensioned by a spring 56 to engage the outer periphery of disk 31. This pawl 54 also has a forwardly or upwardly projecting lug 57. A primary release lever 58 is also pivoted at 55 and has at one end adjacent the trigger or release lever 59 a forwardly projecting lug 60 which is actually formed by striking up or bending the end of the lever at right angles. This lever 58 is tensioned by spring 61 so that the angularly directed end thereof which is beneath the pawl 54 engages against the outer face of disk 31 in a position to contact lug 52 and prevent rotation of the disk. Measured radially from the pivot 55 the primary release lever is shorter than pawl 54 and engages lug 52 only after its release by the pawl. In fact, the mechanism just described constitutes a double release pawl system, the action of which will be described in a later paragraph.

Two other levers are pivoted at 62, the top one of these levers being indicated by numeral 63 and comprising a bell crank lever, the opposite arm of which is tensioned by a spring 64 and which has a bent end forming a lug 65. That lug is engageable by the trigger 59 which is in turn pivoted at 66 and which has a sector-shaped portion 67, one end of which engages the lug 65 just mentioned and the other end of which engages the lug 60 projecting from the primary release lever.

The second one of these levers pivoted at 62 has an arm 68 and an opposite arm 69 having an upturned end or lug 70 which is engaged by lug 60 upon movement of the trigger 59. Trigger 59 is movable throughout a small angular extent and the limits of movement thereof are determined by the length of slot 71 in the outer part 10 of the casing. It is urged in one direction by a spring 59'. Lever 68 is urged downwardly against the disk 31 by a spring 72. The primary release lever 58 is bent to clear the levers pivoted at 62 and both the levers 58 and 69 are curved to pass around the pivot 66 and to provide sufficient clearance so that they may be moved through the requisite angular extent without interference.

The cam plate 31 has cut therein the cam slot 30 within which engages the follower 23 and, as shown in greater detail in Fig. 2a, that cam slot is divided into three major portions, each of which imparts to that part of the shutter mechanism including the blades and the blade ring, or other actuating mechanism, one definite predetermined movement. The curved part of the slot indicated by numeral 73 imparts the opening movement. It moves follower 23 to the left and blade ring 21 in a clockwise direction. The contour of that part of the cam slot actually follows a modified constant acceleration curve developed to impart a constant rate of acceleration and deceleration to the blades themselves. The part 74 of the slot is substantially concentric with the disk and merely provides a dwell during which the blades are held open and remain substantially stationary. The top of the slot indicated by numeral 75 also follows a modified constant acceleration curve and moves the parts for closing the blades. This curve, in a manner similar to that at 73, is developed to impart a constant rate of acceleration and deceleration to the blades during closing. The cam action thus provides a blade opening and a blade closing movement in each of which the constant acceleration and deceleration are found. It is to be noted that the movements for opening and closing the blades and the dwell during which the blades are held in open position take up the greater part of the entire 360° movement for the cam and, therefore, there is no appreciable acceleration of parts prior to starting the blade opening movement, in fact, that being something which the present mechanism is designed to avoid since it is practically impossible to design any mechanism which will stand up under repeated use for a length of time wherein the blade actuated members must stand that impact or blow which is unavoidable upon contact of rapidly moving parts with other parts which have an appreciable mass and which are stationary. The short dwell 74' merely provides for slight movement at the first and second stop pawls and a short period of rest at the end of the cycle.

Again referring to Fig. 1, the retarding mechanism includes a sector-shaped gear 76 pivoted at 77 and having a lug 78 which is engaged by the lug 52 on the cam disk at about the time the blades reach their fully opened position. A spring 79 normally maintains the gear 76 in the positions shown in Figs. 1 and 2 and a pin 80 projecting upwardly through a slot 81 in the front plate 24 engages a cam in the speed setting ring by means of which the gear is held in different predetermined positions in accordance with the amount of retarding influence desired, or, in other words, in accordance with the particular shutter speed for which the ring is set.

The gear 76 meshes with a pinion and serves to rotate a train of gears generally indicated by numeral 82 and terminating in a star wheel 83. This train of gears and the star wheel are more or less conventional and need not be described in greater detail. The star wheel engages a pallet 84 pivoted at one end of a double armed lever 85 which is in turn pivoted at 86 to be movable to swing the pallet into or out of engagement with the teeth of the star wheel. The opposite end of the lever 85 has projecting therefrom and through a slot 87 in front plate 24 a pin 88 engageable by a cam in the speed setting ring. A spring 89 tends to move the pallet 84 into engagement with the star wheel 83.

Now referring to Fig. 5, the speed setting ring 13 has three cam slots therein, each of which affects the position of some one or more of the mecanisms above described. The slot generally indicated by numeral 90 controls the position of the vibrating pallet so that it may or may not engage the teeth of star wheel 33. The cam edge 91 moves pin 88 outwardly against the tension of spring 89 at which time the pallet is disengaged from the star wheel. The opposite end of the slot, or more specifically the cam edge 92, accomplishes the same purpose. The depression 93 permits the pallet to be swung to a position in which it affects the star wheel thereby adding resistance and slowing down the rotation of the gear train.

The cam slot indicated by numeral 94 has two inclined cam edges 95 and 96. The edge 95 which is concentric for a short distance adjacent the right-hand end, Fig. 5, controls the position of the sector gear 76 moving it against the tension of spring 79 so that the projection or lug 78 may be engaged to different extents and for longer or shorter periods of time during the rotation of the cam disk 31. For full retarding effect, the pin 8 rests upon the part of the cam contour nearest the center of the ring. That assures that the retarding effect shall be due to a maximum number of rotations of the gear train. As the ring is rotated counterclockwise, the sector gear is moved away from that position shown in Figs. 1 and 2 so that it has less and less effect on the period of time for which the shutter blades shall be held in open position. The cam edge 95 acts during time and bulb exposures and also during the slow shutter speeds, e. g., from a full second to 1/25 of a second. For shorter speeds, the pallet 84 is withdrawn by the cam edge 92 and at that time the pin 80 drops back to permit full rotation of the gear trains. However, for speeds shorter than 1/25 of a second up to the minimum period of time for which the blades remain open, the pallet is not effective and retardation comes only through the gear train itself. At the maximum speed (shortest exposure) no retarding effect is evident and the period of time which the shutter blades remain in fully opened position is governed by the dwell 74 on the cam and the speed of rotation thereof.

Cam slot 97 controls the position of the levers 63 and 68 so that they may or may not permit time or bulb exposures according to the setting. In Fig. 5, the ring is set for a time exposure and the lug 65 on lever 63 is permitted to move freely throughout its intended extent of travel. The lug 70 is also permitted to drop to a position so that lever 68 may move in for contacting the lug 53.

For bulb exposures, movement of the ring lifts lug 70 on to the cam edge 98 thereby lifting lever 68 so that it can have no effect on disk 31. Lug 65 is still free to move as it did for a time exposure. For all other positions, i. e., instantaneous exposures, both the lugs 65 and 70 are held outwardly by the edge 98 so that neither the lever 63 nor lever 68 could engage lug 53. That is, when once released, the cam disk 31 must make a complete revolution influenced only by the retarding mechanism and resistance offered by the parts to be moved.

Operation

To tension the shutter in preparation for making an exposure, the cocking lever 46 is moved clockwise, Fig. 1, to the full extent of its travel thereby rotating the gear 38 a complete revolution (in practice, actually a few degrees more than a revolution) for tensioning or winding spring 34. At that time, the cam disk 31 is prevented from moving counter-clockwise and, of course, the spring is under considerable initial tension.

Assuming that the speed setting ring is at the position of Fig. 5, i. e., is set for making a time exposure, the pallet 84 is withdrawn, the gear train is set for exerting its full retarding influence except for that of the pallet, and both lugs 65 and 70 are free to move so that the levers 63 and 68 may move under the influence of their respective springs to engage lug 53 on disk 31. During the rotation of the spring casing 35 to wind the spring, the shutter is also cocked for release. Lug 48 on that casing was caused to strike against the projection 57 on lever 54 thereby disengaging it from the lug 52. That permitted the disk 31 to move very slightly until the lug 52 stopped against the engaging portion of primary release lever 58. Thereafter, the shutter is in readiness for being tripped.

Movement of the trigger 59 in a counterclockwise direction first permits lug 65 to move toward the center of the shutter, Fig. 2, thereby allowing lever 63 to drop to the outer surface of disk 31. Primary release lever 58 contacted by engagement of the sector portion 67 of the trigger moves counterclockwise about pivot 55 thereby releasing lug 52. The disk 31 may then move counterclockwise until lug 53 engages the end of lever 63. That much movement permits complete opening of the shutter blades and also allows the cam to pass through the dwell portion 74. After the blades are open, lug 53 engages the projection 78 on the sector gear 76 so that the parts are retarded somewhat before lug 63 strikes the end of the lever thereby to lessen the shock which might be forthcoming if the parts were travelling at greater speed. Upon release of trigger 59, the lever 63 is withdrawn, but lever 68 under the influence of spring 72, falls into the position shown in Fig. 2 so that there occurs at that time only a slight angular movement of the cam disk. It is to be understood that that spring which returns the trigger 59 to its initial position is strong enough to withdraw lever 63 from engagement with lug 52. The timing is such that before withdrawal of lever 63, lever 68 has moved down to a position against the surface of the disk. A second movement of the trigger acting through lugs 60 and 70 serves to lift lever 68 out of engagement with lug 52 thereby permitting the cam to rotate the remainder of its revolution for closing the shutter blades. The parts will then have returned to their original positions, the spring motor having run down for one revolution.

For effecting a bulb exposure, the time ring is turned slightly to the proper position and the only change which comes about as a result of that setting is that lug 70 is raised on to cam surface 98. That withdraws the lever 68 so that when the trigger 59 is pushed downwardly or moved counterclockwise, Fig. 2, the shutter having been tensioned as before, the primary release lever permits the blades to be opened and the cam to pass through the dwell region until lug 53 stops against the end of lever 63 which will have moved downwardly as before described with respect to a time exposure. Upon releasing the trigger, lever 63 will be withdrawn thereby permitting lug 52 to pass and the cam to close the blades.

For instantaneous exposures, further movement of the time setting ring maintains lug 70 in position on surface 98 and also permits that surface to engage lug 65 so that lever 63 is not permitted to drop to a position for engaging lug 53. For the slower exposures, the pallet controlled by cam edge 93 moves to a position for affecting the star wheel, and for the longest exposure, pin 80 is positioned as shown in Fig. 1 so that the full effect of the retarding mechanism is realized. Actuation of the trigger 59 releases the disk 31 and, except for the influence of the retarding mechanism, the cam is free to make a complete revolution thereby opening and closing the shutter blades.

Further movement of the time setting ring merely changes the interval through which the shutter blades are retained in open position. By swinging the disk 76 farther to the right, Fig. 2, shorter travel of the gear train cuts down the period of time consumed while the cam is moving through the dwell 74. At that time, the pallet is in engagement with the star wheel.

For shorter speeds, the pallet is withdrawn and the retarding effect of the gear train itself serves to time the shutter from speeds of $1/25$ down to the minimum exposure provided. At that speed the effect of the train is entirely removed.

*Modification*

In Figs. 6 and 7, a modification is shown in which the cam is of a different type and in which the blade ring has been modified to function with the cam. A cam 99 is mounted for rotation upon a spindle 100 which is similar to the spindle 32, Fig. 4. The spindle 100 is turned down and serves as a bearing for the cam. It is permanently attached to plate 25' similar to the plate 25, Fig. 4. The cam 99 has a similar curvature to that of the cam slot 30 and functions to open the blades, to hold them open, and to close them in the same way. The cam functions between two projecting arms 101 and 102, these being formed as a part of the blade ring 103, the details of which are not shown but which connects to the blades and imparts movement to them in a manner similar to the blade ring 21, Fig. 3.

A spring 34' connects at its inner end to a sleeve 104, which is operatively attached to a lower spring casing member 105, by means of which the movement of the spring is imparted to the cam. This member 105 also encloses the lower part of the spring and carries lug 52' and also another lug similar to the lug 53, Fig. 2. These lugs are positioned in such manner that they are engageable by the levers and pawls described above and no further explanation of their function need be given here. The casing member 105 is permanently attached in any desired manner so that the cam 99, casing 105, and sleeve 104 move as a unit.

While one embodiment of the invention and modifications thereof have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a camera shutter of the type described, the combination of a casing, a plurality of shutter blades movable to and from open and closed positions to effect an exposure, means interconnecting the said blades and movable through a predetermined angular extent for imparting the said opening and closing movements to the blades, and means for effecting movement of said means for actuating the blades including a spring, means for tensioning said spring including a gear, a toothed ring and a setting lever, the teeth of said ring being positioned to mesh with teeth on said gear so that upon angular movement of said setting lever said gear may be rotated, and means interconnecting said spring and gear operable for imparting rotation of the gear to the spring, but being disengageable upon release of said setting lever thereby to provide free relative movement between the gear and means interconnecting it with the spring, and a cam movable by said spring and engageable with said blade moving means, said cam having its contour divided into at least three shutter controlling parts, one of which imparts the opening movement, one of which provides a period during which the blades are held open, and the third of which effects closing of the blades, the first said part of the contour providing for opening the blades with a constant acceleration for part of the movement and then for constantly decelerating them for the later part of the movement, the second a dwell in which substantially no movement is imparted, and the third a curve for constantly accelerating and then constantly decelerating the closing movement of the blades.

2. In a camera shutter of the type described, the combination of a casing, a plurality of shutter blades movable to and from open and closed positions to effect an exposure, means connected to said blades and movable through a predetermined angular extent for imparting the said opening and closing movements to the blades, and means for effecting movement of said means for actuating the blades including a spring, a spring casing, means for tensioning said spring, a cam movable with said spring as it unwinds after tensioning and upon release, said cam being positioned for contacting with means which imparts the opening and closing movement to the blades, said means for tensioning said spring including a gear, a toothed ring and a setting lever, the teeth of said ring being positioned to mesh with teeth on said gear so that upon angular movement of said setting lever said gear may be rotated, and means for imparting movement of said gear to the spring casing comprising interengageable drive means between the gear and casing for rotating one with the other in a direction for winding the spring, but being disengageable upon release of the spring to permit the casing to move as the gear remains stationary, means for retaining said spring in tensioned condition including a spring casing, a stop pawl, and means on said casing with which said pawl may engage, means for holding said cam to prevent rotation thereof during winding of said spring including a pawl engageable with a part of said cam, a primary release lever for holding said cam against rotation and for releasing it when the shutter is to be opened, and means effective when said spring is wound for releasing said pawl engageable with the cam, thereby permitting the cam to move slightly and be held only by said primary release lever.

3. In a camera shutter of the type described, the combination of a casing, a plurality of shutter blades movable to and from open and closed positions to effect an exposure, means connected to said blades and movable through a predetermined angular extent for imparting the said opening and closing movements to the blades, and means for effecting movement of said means for actuating the blades including a spring, means for tensioning said spring, a cam movable with said spring as it unwinds after tensioning and upon release, said cam being positioned for contacting that means which imparts the opening and closing movement to the blades, means for tensioning said spring including a gear and a spring casing, a toothed ring and a setting lever, the teeth of said ring being positioned to mesh with teeth on said gear so that upon angular movement of said setting lever said gear may be rotated, and means interconnecting said spring and gear operable for imparting rotation of the gear to the spring but being disengageable upon release of the spring thereby to provide free relative movement between the two, said means including a disk connected for rotation with said spring casing, said disk having means projecting therefrom for engagement with complementary means in the gear so that rotation of the gear will rotate the disk and wind the spring, but of such construction that after winding the spring the gear may be rotated in the reverse direction without moving the disk or spring, said cam having its contour divided into at least three parts, one of which imparts the opening movement, one of which provides a period during which the blades are held open, and the third of which effects closing of the blades, the first said part of the contour following first a constant acceleration and then a constant deceleration curve, the second a dwell in which substantially no movement is imparted, and the third a curve for first constantly accelerating and then constantly decelerating the closing movement of the blades.

4. In a camera shutter of the type described, the combination of a casing, a plurality of shutter blades movable to and from open and closed positions to effect an exposure, means connected to said blades and movable through a predetermined angular extent for imparting the said opening and closing movements to the blades, and means for effecting movement of said means for actuating the blades including a spring, a casing for said spring to which one end of the spring is fixed, means for tensioning said spring, a cam including a disk having a cam slot therein movable with said spring as it unwinds after tensioning, a cam follower projecting from said means connected to the said blades and engaging within said cam slots, means for maintaining said spring in tensioned condition including a stop pawl engageable with a projection from the spring casing to prevent unwinding of the tensioned spring, shutter releasing means including a trigger, a primary release lever spring pressed into engagement with the periphery of the disk and controlled to be withdrawn therefrom by said trigger, time and bulb exposure levers controlled by said trigger, and a secondary released pawl spring pressed into engagement with the periphery of said cam disk, lugs projecting from said cam disk including one lug adjacent one face thereof and engageable by the primary release lever and by the secondary release pawl only, and a second lug adjacent the opposite face of said disk and angularly spaced from the first, said second-mentioned lug being engageable only by said time and bulb exposure controlling levers, and a projection from said secondary release pawl extending into the path of said lug on the spring casing for tripping said secondary release pawl thereby to permit engagement of the first-mentioned lug on the cam disk with the primary release lever.

5. In a camera shutter of the type described, the combination of a casing, a plurality of shutter blades movable to and from open and closed positions to effect an exposure, means connected to said blades and movable through a predetermined angular extent for imparting the said opening and closing movements to the blades, and means for effecting movement of said means for actuating the blades including a spring, a casing for said spring to which one end of the spring is fixed, means for tensioning said spring, a cam including a disk having a cam slot therein movable with said spring as it unwinds upon release after tensioning, a cam follower projecting from said means connected to the said blades and engaging within said cam slot, means for maintaining said spring in tensioned condition including a stop pawl engageable with a projection from the spring casing to prevent unwinding of the tensioned spring, shutter releasing means including a trigger, a primary release lever spring pressed into engagement with the periphery of the cam disk and controlled to be withdrawn therefrom by said trigger, time and bulb exposure levers controlled by said trigger, and a secondary release pawl spring pressed into engagement with the periphery of said cam, lugs projecting from said cam disk including one lug adjacent one face thereof and engageable by the primary release lever and by the secondary release pawl only, and a second lug adjacent the opposite face of said disk and angularly spaced from the first, said second-mentioned lug being engageable only by said time and bulb exposure controlling levers, and a projection from said secondary release pawl extending into the path of said lug on the spring casing for tripping said secondary release pawl thereby to permit engagement of the first-mentioned lug on the cam disk with the primary release lever, said cam slot having its contour divided into at least three parts, one of which imparts the opening movement, one of which provides a period during which the blades are held open, and the third of which effects closing of the blades, the first said part of the contour providing for opening the blades with a constant acceleration for part of the movement and then for constantly decelerating them for the later part of that movement, the second a dwell in which substantially no movement is imparted, and the third a curve for constantly accelerating and then constantly decelerating the closing movement of the blades.

6. In a camera shutter of the type described, the combination of a casing, a plurality of shutter blades movable to and from open and closed positions to effect an exposure, means connected to said blades and movable through a predetermined angular extent for imparting the said opening and closing movements to the blades, means for effecting movement of said means for actuating the blades including a spring, a casing for said spring to which one end of the spring is fixed, cam means for engaging and for actuating that means which connects to and imparts movement to the blades, and means for connecting said cam means to the opposite end of said spring from that connected to the casing, means for supporting said spring, casing, and the cam means, and means for winding said spring including a gear, a lever, and a ring movable with said lever and having teeth thereon engageable with teeth on said gear, a disk concentric with and adjacent said gear and attached to said spring casing, and means for imparting rotation of the gear to the said disk including at least one slot in one of the elements and cooperating therewith a spring-urged, inclined, pawl-like member, means for preventing unwinding of the spring including a stop pawl and a lug on said casing engaged by the pawl, and other means for preventing unintended rotation of the cam including a projecting lug on the cam, a primary release lever and a secondary release pawl engageable with said lug.

FREDERICK P. WILLCOX.

REFERENCES CITED

The following references are of record in the file of this patent:

UNITED STATES PATENTS

| Number    | Name         | Date          |
|-----------|--------------|---------------|
| 1,341,823 | Riddell et al. | June 1, 1920 |
| 1,856,308 | Barenyi      | May 3, 1932   |
| 2,269,400 | Steiner      | Jan. 6, 1942  |
| 2,308,002 | Fuerst       | Jan. 12, 1943 |
| 2,326,077 | Steiner      | Aug. 3, 1943  |
| 2,371,072 | Simmon et al. | Mar. 6, 1945 |